June 21, 1949.  A. P. FONTAINE  2,473,792
AUTOMATIC FLAP RETRACTOR
Filed Sept. 17, 1945  3 Sheets-Sheet 1
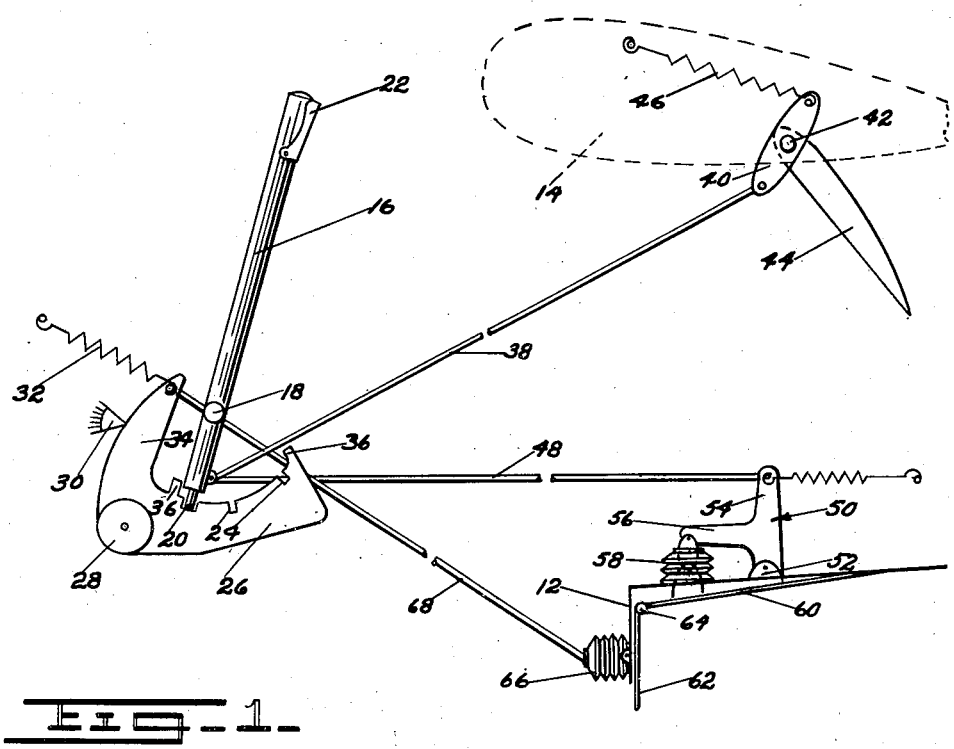
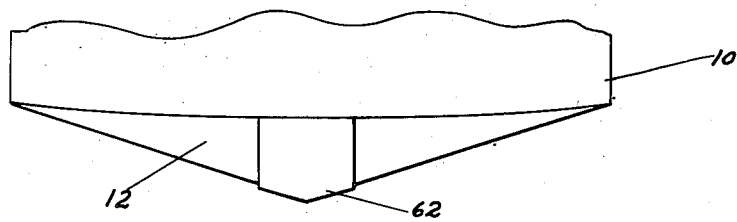
INVENTOR.
ATHANAS P. FONTAINE
BY
*O. H. Fowler*
ATTORNEY

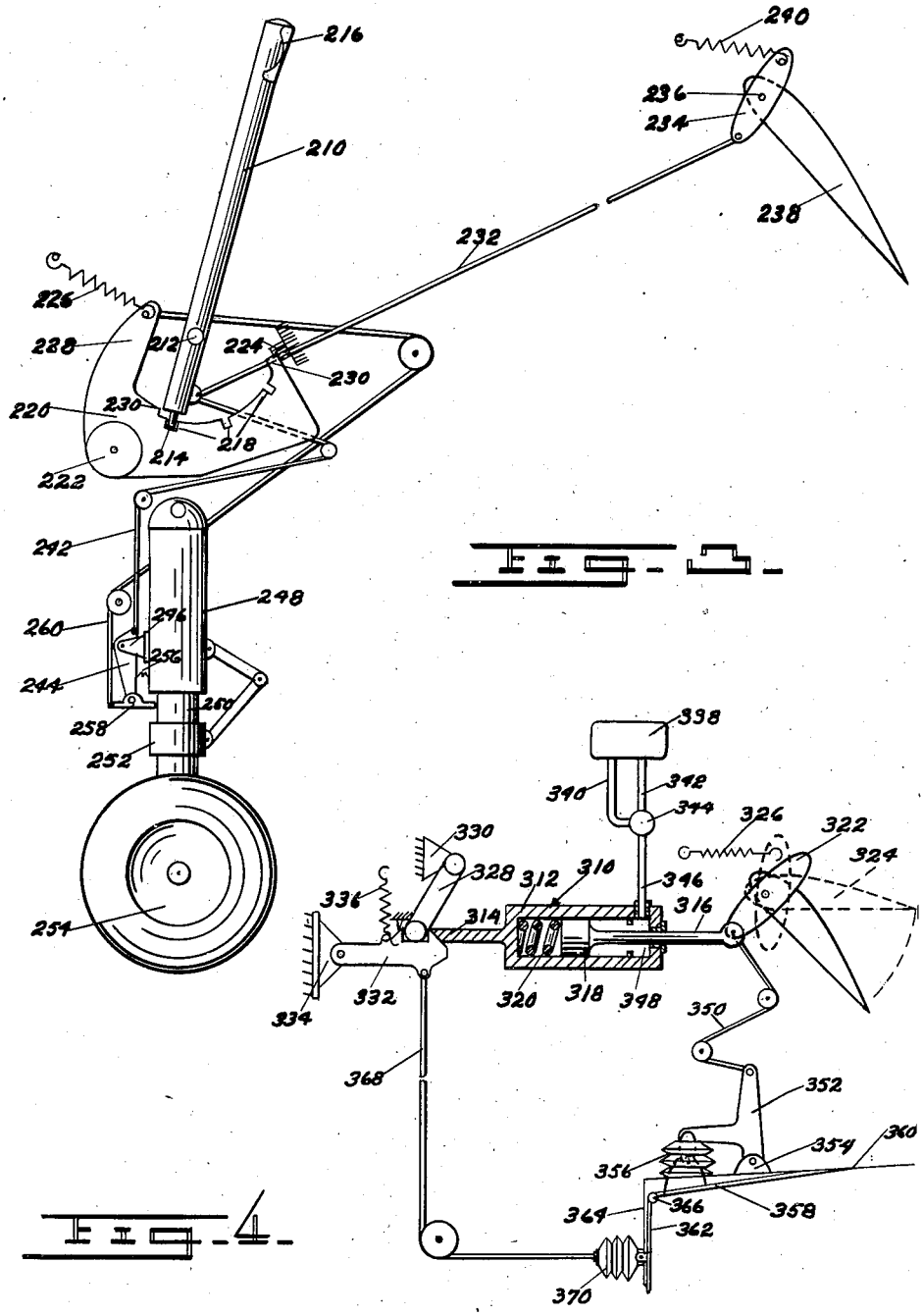

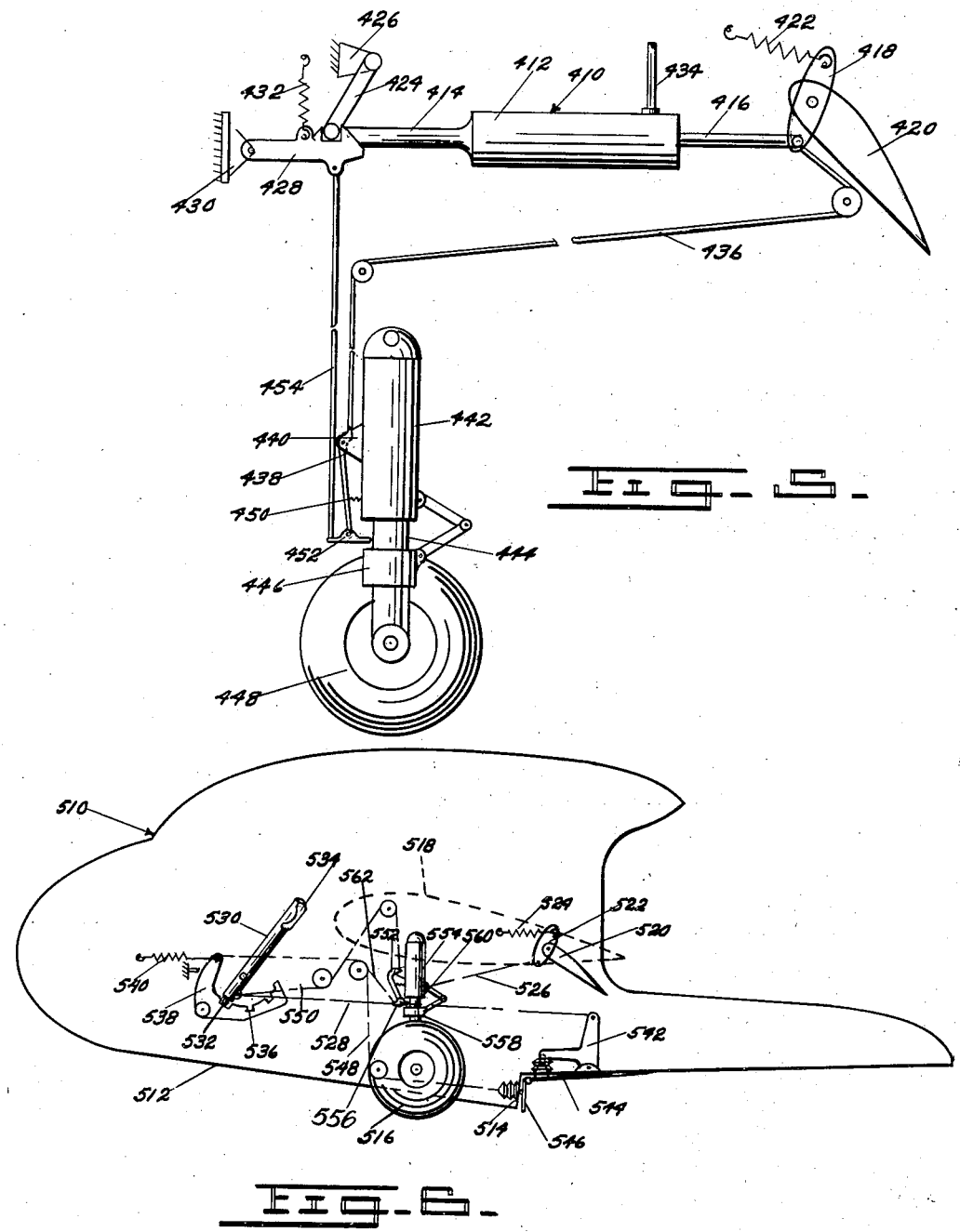

Patented June 21, 1949

2,473,792

UNITED STATES PATENT OFFICE 2,473,792

AUTOMATIC FLAP RETRACTOR

Athanas P. Fontaine, Detroit, Mich., assignor to Bendix Aviation Corporation, Detroit, Mich., a corporation of Delaware Application September 17, 1945, Serial No. 616,893

1 Claim. (Cl. 244—42)

This invention relates to aircraft, and more particularly to flap actuating mechanisms for aircraft.

The principal object of the invention is to provide means for automatic retraction of the flaps of an aircraft, upon the landing of said craft.

Another object of the invention is to provide automatic flap retracting means for an aircraft operative upon the settling of the craft to the ground on landing wheels, or upon the contact of the aircraft's hull on water.

A further object of the invention resides in the utilization of automatic flap retracting means on aircraft to minimize the danger of damaging the extended flaps on ground irregularities such as bumps, weeds, shrubs, etc., or on water in case of an amphibious landing.

And yet another object of the invention is to provide the advantage inherent in automatic flap retracting means of quickly decreasing the lift of an aircraft's wings after the first moment of landing contact, so as to foreshorten the time lapse between the last moment the aircraft is fully air borne and the moment when said craft is fully land or water borne, thereby providing for a safer and easier landing.

A still further object of the invention is to provide landing actuated flap retraction means for an amphibian type aircraft, so that automatic flap retraction occurs whether the aircraft lands on ground or on water.

The invention provides for the following flap operations:

1. Automatic flap retraction from a full flap angle such as utilized in landing.
2. Manual flap retraction from a full flap angle when a change in the decision to land occurs.
3. Manual flap retraction from a partial full flap angle position as used in take-offs.

Other objects and advantages of the invention will be apparent from the following description taken in conjunction with the drawings forming part of this specification and in which—

Fig. 1 is a diagrammatic view of automatic flap retracting means for a seaplane;

Fig. 2 is an end view of the hull of the seaplane illustrating the actuating means for automatic flap retraction;

Fig. 3 is a diagrammatic view of automatic flap retracting means for a landplane;

Fig. 4 is a diagrammatic view of a modification of the invention for a seaplane;

Fig. 5 is a diagrammatic view of a modification of the invention for a landplane; and Fig. 6 is a diagrammatic view of automatic flap retracting means for an amphibian type aircraft.

Referring to the drawings for more specific details of the invention, a conventional aircraft of the seaplane or flying boat type, partially shown, has a hull 10, a step 12 on the hull, and wings 14. Situated in the pilot's compartment of the aircraft is a flap control lever 16 pivotable about a pinion 18, said lever having a pawl 20 axially movable with respect to the lever by a trigger 22. The pawl 20 is adapted to singly engage a plurality of slots 24 in the arcuate face of a crank rack 26 pivotable about a shaft 28 suitably connected to the aircraft. The rack 26 is yieldingly retained against a stop 30 by a spring 32 attached at one end to an arm 34 of the rack 26 and at the other end to a stationary member of the aircraft, not shown. Two spaced stops 36 on the arcuate face of the rack 26 are adapted to define the limits of the angular movement of the lever 16.

A cable 38 is connected at one end to the lever 16 and at the other end to a crank lever 40 attached as by a pin 42 to a flap 44 in a wing 14. The opposite end of the lever 40 has connected thereto a spring 46 also connected to a stationary member of the aircraft.

Another cable 48 is connected to the control lever 16 and a bell crank lever 50 pivotable at 52. One arm 54 of the lever 50 has a spring connected thereto, said spring being connected to a stationary member of the aircraft, and the other arm 56 of the lever 50 is toggled within a watertight bellows 58 to a metal spring plate 60 secured at one end to the hull 10 of the aircraft and adapted to be yieldingly movable away from the hull. The plate 60 is hinged to a trip plate 62 and a spring 64 in the hinge joint is adapted to urge the plate 62 into contact with the step 12 of the hull. The plate 62 has attached thereto within a water-tight bellows 66 a cable 68 connected to the arm 34 of the crank rack 26.

As shown in Fig. 1, the flap 44 is in the full down position preparatory for a landing of the aircraft. When the hull 10 contacts the water, the plate 62 moves outwardly from the step 12 and the cable 68 moves the crank rack 26 in a clockwise direction to free the pawl 20 from engagement with the slot 24. The spring loaded flap returns to the retracted or full up position and the spring loaded bell crank lever 50 moves in a clockwise direction to return the plate 60 to full contact with the hull and to move the trip plate 62 out of pressure contact with the water. The spring loaded rack 26 then moves counter-clockwise to contact the stop 30.

For take-offs of the aircraft, the flaps 44 may be moved to a half down position by pressing the trigger 22 on the lever 16 and manually moving said lever to engage the pawl with the middle slot in the crank rack 26. This lowers the flaps 44 to a half down position, but, due to a difference in slack between the cable 38 and the cable 48, is not operative to move the bell crank lever 50.

When the aircraft is in flight, the trigger 22 is pressed to retract the pawl, and to allow the spring loaded flap 44 to return to full up position. This moves the lever 16 to allow the engagement of the pawl 20 in the right slot 24.

To move the flaps 44 to a full down position for landing, the trigger 22 is pressed and the lever 16 is manually moved to engage the pawl 20 in the left slot of the rack 26. This movement of the lever is operative through the cable 38 and the crank lever 40 to move the flaps 44 to a full down position, and simultaneously, the movement of the cable 48 causes a downward movement of the arm 56 of the bell crank lever 50 to move the plate 60 away from the hull and to project the end of the trip plate 62 into the airstream, as shown in Fig. 1, to cock said trip plate. The airstream pressure is insufficient to overcome the combined force of the spring 64 and the spring 32 to move the plate 62 outwardly from the step of the hull.

A modification of the invention embodied in a conventional aircraft of the landplane type is shown in Fig. 3.

A flap control lever 210 pivotable about a pinion 212 has a pawl 214 axially movable with respect to the lever by a trigger plate 216. The pawl 214 is adapted to singly engage a plurality of slots 218 in the arcuate face of a crank rack 220 pivotable about a shaft 222. The rack 220 is yieldingly retained against a stop 224 by a spring 236 attached at one end to an arm 228 of the rack 220 and at the other end to a stationary member of the aircraft, not shown. Two spaced stops 230 on the arcuate face of the rack 220 are adapted to define the limits of angular movement of the lever 210.

A cable 232 is connected at one end to the lever 210 and at the other end to a crank lever 234 attached as by a pin 236 to a flap 238 in the trailing edge of a wing of the aircraft, not shown, The opposite end of the lever 234 has connected thereto a spring 240 also connected to a stationary member of the aircraft.

Another cable 242 connects to the control lever 210 and extending over two rotatable pulleys, is connected to a crank lever 244 pivotable on an arm 246 of a stationary cylinder 248 of a landing wheel shock absorber having a piston 250 with a fixed collar 252 thereon. The piston 250 is connected to a wheel 254 of the aircraft.

The crank lever 244 is yieldingly urged away from the cylinder 248 by a spring 256 in compression connected to both the lever and the cylinder. The lower end of the crank lever 244 has pivotably attached thereto a trigger 258 having one end adjacent the piston 250 between the cylinder 248 and the collar 252 on the piston, the other end having attached thereto a cable 260 extending over rotatable pulleys and connected to the arm 228 of the crank rack 220.

As shown, the flaps 238 are in the full down position preparatory to a landing. When the aircraft touches the ground, the initial landing impact on the wheel 254 forces the piston 250 into the cylinder 248 and the collar 252 strikes the trigger 258 causing the cable 260 to be pulled downwardly. The downward movement of the cable 260 causes the crank rack 220 to be moved in a clockwise direction against the spring 236 to free the pawl 214 of the lever 210 from engagement with the slot 218 and allow the lever to move in a counter-clockwise direction. The spring loaded flap 238 returns to the full up position and the absence of tension in the cable 242 allows the crank lever 244 to be moved outwardly from the cylinder 248 by the compression spring 256.

For take-offs of the aircraft, the flaps 238 may be moved to half down position by pressing the trigger 216 on the lever 210 and manually moving said lever to insert the pawl in the middle slot 218 of the crank rack 220. This lowers the flaps 238 to a half down position, but, due to a difference in slack between the cable 232 and the cable 242, is not operative to move the bell crank lever 244.

When the aircraft is in flight, the trigger 216 is pressed to retract the pawl, and to allow the spring loaded flap 238 to return to a full up position. The return of the flap brings pawl 214 into engagement with the right slot 218.

To move the flap 238 to a full down position for landing, the trigger 216 is pressed and the lever 210 is manually moved to engage the pawl 214 in the left slot of the rack 220. This movement of the lever is operative through the cable 232 and the crank lever 234 to move the flap to a full down position, and, simultaneously, the movement of the cable 242 causes the crank lever 244 to move toward the cylinder 248 against the spring 256. The mechanism is now in the condition shown in Fig. 3.

Another modification of the invention is shown in Fig. 4. This modification differs from the aforementioned embodiment of the invention in that mechanical means are provided to actuate the flaps and attendant mechanism. This form of the invention is particularly suited for large seaplanes where manually operated flaps are not feasible. As shown, this modification embodies a hydraulic jack strut 310 having a cylinder 312 with a fixed arm 314 and a movable arm 316, the movable arm being a portion of a piston 318 movable within the cylinder 312 under the influence of fluid pressure against the action of a spring 320. The arm 316 is connected to one end of a crank lever 322 fixed to a flap 324. The other end of the crank lever has a spring 326 connected thereto, said spring being fastened to a fixed member of an aircraft, not shown.

The fixed arm 314 of the jack strut 310 is pivotably connected to a toggle link 328 which is in turn pivotably connected to a fixed support 330.

A catch arm 332 pivotably connected to a fixed support 334 has a slot adapted to receive and retain the end of the toggle link 328 when the catch arm is in a horizontal position under the influence of a spring 336 connected to the arm and to a fixed member of the aircraft, not shown.

A fluid supply source 338 has communicating therewith conduits 340 and 342 leading into a valve 344, and a conduit 346 leads from the valve to a cylinder chamber 348.

Attached to the end of the crank lever 322 is a cable 350 connected to a bell crank lever 352 pivotable at 354. The lever 352 is connected through toggles within a water tight bellows 356 to a spring plate 358 attached at one end to the bottom of the hull 360 of the aircraft. The plate 358 is hinged to a trip plate 362 adapted to be yieldingly urged toward a step 364 of the hull 360 by a spring 366.

A cable 368 attached to the catch arm 332 passes over a rotatable pulley and is connected through a water tight bellows 370 to the trip plate 362.

As shown, the flaps 324 are in the fully down position preparatory to landing. When the aircraft touches the water, the trip plate 362 is forced outwardly from the step 364 of the hull 360 causing the cable 368 to pull the catch arm 332 downwardly against the spring 336 to allow the fixed arm 314, cylinder 312, and arm 316 to move as one unit to the right under the influence of the spring 326 to allow the flap 324 to return to a full up position. Fluid under pressure in the chamber 348 of the cylinder prevents relative movement between the cylinder 312 and the arm 316. The movement of the jack strut to the right removes the tension from the cable 350 and allows the spring plate to become flush with the hull which in turn removes the trip plate from the water pressure area and allows it to become flush with the step 364.

Valve 344 may then be opened to allow the escape of the fluid in chamber 348 through the conduits 346 and 340. Since the arm 316 is not movable to the right while the flaps 324 are in the full up position, the spring 320 forces the cylinder 312 and arm 314 to the left to engage the end of the toggle link in the slot of the catch arm 332.

During the take-offs, the flaps 324 may be lowered to a half down position by opening valve 344 and allowing a predetermined amount of fluid under pressure to enter the chamber 348. The fluid forces the piston 318 to the left, since the cylinder 312 is held immovable by the catch arm 332. The cable 350 is arranged in such a manner that the movement of the flaps 324 to a half down position and the attendant clockwise movement of the crank lever 322 serves to draw the cable taut and no action on lever 352 results.

After the plane is in flight, the flaps are returned to a full up position by opening valve 344 to allow the escape of the fluid in chamber 348. The spring loaded piston 318 moves to the right and the spring loaded flaps move to a full up position.

To complete the cycle and return the mechanism to the condition shown in Fig. 4, the flaps 324 are completely lowered and the trip plate cocked for a landing operation in the following manner: Valve 344 is opened allowing fluid under pressure to enter the chamber 348 and force the piston 318 fully to the left. The consequent movement to the left of arm 316 imparts a clockwise movement to the crank lever 322 which serves to completely lower the flaps and cause a counter-clockwise movement of the bell crank lever 352 through cable 350, said movement of lever 352 being effective to urge the plate 358 away from the hull and deflect the plate 362 downward to project beneath the step 364.

Fig. 5 illustrates a modification of the invention embodying a jack strut similar to that of Fig. 4. This modification is applied to landplanes. In both this and the previous modification electrically operated jack struts may be substituted for the hydraulic type struts.

As shown, the invention embodies a hydraulic jack strut 410 having a cylinder 412 with a fixed arm 414 and a movable arm 416, the movable arm being a portion of a piston, not shown, movable within the cylinder 412 under the influence of fluid pressure against the action of a spring, not shown. The jack strut is similar to that shown in Fig. 4.

The arm 416 is connected to one end of a crank lever 418 fixed to flaps 420. The other end of the crank lever has a spring 422 connected thereto, said spring being fastened to a fixed member of an aircraft, not shown.

The fixed arm 414 of the jack strut 410 is pivotally connected to a toggle link 424 which in turn is pivotably connected to a fixed support 426.

A catch arm 428, pivotably connected to a fixed support 430, has a slot adapted to receive and retain the end of the toggle link 424 when the catch arm is in a horizontal position under the influence of a spring 432 connected to the arm and to a fixed member of the aircraft, not shown.

A fluid supply source, not shown, is connected to the cylinder 412 through a conduit 434.

Attached to an end of the crank lever 418 is a cable 436, extending over two rotatable pulleys, connected to a crank lever 438 pivotable on an arm 440 of a stationary cylinder 442 of a landing wheel shock absorber having a piston 444 with a fixed collar 446 thereon. The piston 444 is connected to a wheel 448 of the aircraft.

The crank lever 438 is yieldingly urged away from the cylinder 442 by a spring 450 in compression connected to both the lever and the cylinder. The lower end of the crank lever 438 has pivotally attached thereto a trigger 452 having one end adjacent the piston 444 between the cylinder 442 and the collar 446, the other end having attached thereto a cable 454 connected to the catch arm 428.

As shown, the flaps 420 are in the full down position preparatory to a landing. When the aircraft touches the ground, the initial impact on the wheel 448 forces the piston 444 into the cylinder 442, and the collar 446 strikes the trigger 452 causing the cable 454 to be pulled downwardly. The downward movement of the cable 454 causes the catch arm 428 to move downwardly against the force of the spring 432 to free the end of the toggle link 424 from the slot of the catch arm. The arm 414, the cylinder 412, and the arm 416 move to the right under the influence of spring 422 and the flaps 420 return to the full up position. The absence of tension in the cable 436 allows the crank lever 438 to be moved outwardly from the cylinder 442 by the compression spring 450.

The fluid is then allowed to flow out of the cylinder 412 through conduit 434 to a sump, not shown, to cause the cylinder 412 and arm 414 to move to the left, as viewed in Fig. 5, to engage the end of the toggle link 424 in the slot of the catch arm 428.

For take-offs of the aircraft, the flaps 420 may be moved to a half down position by allowing a predetermined amount of pressurized fluid to enter the cylinder 412 to force arm 416 partially within the cylinder and move the lever 418 to a clockwise direction to partially lower the flaps. The cable 436 is so arranged that the movement of the lever 418 during a partial lowering of the flaps is effective to take up the slack in said cable without effecting the crank lever 438.

When the aircraft is in flight, the removal of fluid from the cylinder 412 through conduit 434 by the opening of a valve, not shown, is effective to force arm 416 to the right to combine with the effect of spring 422 to raise the flaps 420.

To restore the mechanism to the condition of Fig. 5 preparatory to landing, fluid is forced into the cylinder 412 to move the arm 416 to the left inwardly of the cylinder. The crank lever 418 is turned in a clockwise direction to move the flaps 420 to a full down position and to pull the cable 436 to impart a counter-clockwise movement of the crank lever 438 against the influence of the spring 450. The end of the trigger 452 is now between the cylinder 442 and the collar 446 on the piston 444.

Fig. 6 shows a modification of the invention for amphibian aircraft, said modification embodying means operative to automatically retract the flaps during either a ground or water landing.

As shown, an amphibian aircraft 510 has a fuselage or hull 512, a step 514 on the hull, landing wheels 516, and wings 518. In the wings 518 are flaps 520 connected to a pivotable crank lever 522 having one end thereof connected to a spring 524 attached to a fixed member of the aircraft, and the other end thereof attached to a cable 526 connected to another cable 528.

The cable 528 is attached at one end to a pivotable lever 530 having a pawl 532 retractable by a trigger 534, said pawl being adapted to singly engage a plurality of slots 536 in a pivotable crank rack 538 having a spring 540 connected thereto, and to a fixed member of the aircraft. The other end of the cable 528 is connected to a bell crank lever 542 attached through a water tight bellows to a spring plate 544 connected at one end to the hull 512 and at the other end to a spring loaded trip plate 546.

The trip plate 546 is connected through a watertight bellows to a cable 548, extending over a plurality of rotatable pulleys, connected to the crank rack 538.

Another cable 550, connected to the lever 530, extends over a plurality of rotatable pulleys and is connected to a crank lever 552 pivotable on an arm connected to a fixed shock absorber cylinder 554. The lever 552 is yieldingly urged away from the cylinder 554 by a compression spring, and a trigger 556 pivotable on the lever 552 has one end thereof between the cylinder 554 and a collar 558 of a piston 560 movable in the cylinder, the other end of the trigger 556 having a cable 562 connected thereto tied in to cable 548.

As shown, the mechanism is ready for a landing of the aircraft on land. The impact on the wheels 516 in landing causes the collar 558 to trip the trigger 556 to pull the cable 562 and turn the crank rack 538 in a clockwise direction against the spring 540. This action frees the pawl 532 from the slot and the spring loaded lever 522 turns in a counter-clockwise direction to raise the flaps 520 fully.

If the aircraft had landed on water the trip plate 546 would be forced outwardly from the step 514 by water pressure to pull the cable 548 and cause the same rotation of the crank rack and the lever 522.

For take-offs of the aircraft, the lever 530 is moved to engage the pawl 532 in the middle slot of the crank rack to move the flaps to a half down position through a pulling of the cable 526. Due to slack in the cables 528 and 550, this movement of the lever 530 is not effective to cause any movement of said cables. After the aircraft is air borne the lever is moved to engage the pawl 532 in the right slot of the rack 538, as viewed in Fig. 6. This allows the spring loaded flap to return to the full up position.

To return the mechanism to the condition in Fig. 6, the lever 530 is moved to engage the pawl 532 in the left slot of the rack 538. This movement is effective to pull the cables 526, 528 and 550 to respectively completely lower the flaps 520, cock the trip plate 546 by projecting it below the step 514 of the hull, and move the lever 552 in a counter-clockwise direction to bring the lever 556 between the cylinder 554 and the collar 558 of the piston 560 against the compression spring shown.

While this invention has been described in connection with certain specific embodiments, the principle involved is susceptible of numerous other applications that will readily occur to persons skilled in the art. The invention is, therefore, to be limited only as indicated by the scope of the appended claim.

Having thus described the various features of the invention, what I claim as new and desire to secure by Letters Patent is:

In a control system for an aircraft having wing flaps and a shock strut, a fixed support, a lever pivoted on the fixed support having a pawl at one end thereof, a rack pivoted on the fixed support having spaced slots adapted to receive the pawl, a crank on the flap, resilient means associated therewith urging the flap to a retracted position, a trigger adapted to be actuated by loading the shock strut, a first cable connecting the crank to the lever, a second cable connecting the rack to the trigger, a third cable connecting the lever to the trigger, means associated with the rack to yieldingly oppose any rotation thereof occasioned by a loading of the shock strut, and means yieldingly urging the trigger away from the shock strut.

ATHANAS P. FONTAINE.

REFERENCES CITED

The following references are of record in the file of this patent:

UNITED STATES PATENTS

| Number | Name | Date |
| --- | --- | --- |
| 1,995,905 | Sikorsky | Mar. 26, 1935 |
| 2,173,273 | De Seversky | Sept. 19, 1939 |
| 2,198,893 | Van Waveren | Apr. 30, 1940 |
| 2,316,235 | Gast | Apr. 13, 1943 |